United States Patent [19]
Jackovitz et al.

[11] Patent Number: 4,804,598
[45] Date of Patent: Feb. 14, 1989

[54] SEPARATOR SYSTEMS FOR SILVER-IRON BATTERIES

[75] Inventors: John F. Jackovitz, Monroeville Boro; Hilary Moyes, Penn Hills Township, Allegheny County; Edward S. Buzzelli, Murrysville, all of Pa.

[73] Assignee: Westinghouse Electric Corp., Pittsburgh, Pa.

[21] Appl. No.: 133,589

[22] Filed: Dec. 14, 1987

[51] Int. Cl.$^4$ .............................................. H01M 2/16
[52] U.S. Cl. ..................................... 429/254; 429/144
[58] Field of Search ................................. 429/144, 254

[56] References Cited

U.S. PATENT DOCUMENTS

| | | | |
|---|---|---|---|
| 3,615,865 | 10/1971 | Wetherell | 429/254 |
| 3,749,604 | 7/1973 | Langer et al. | 136/20 |
| 3,953,241 | 4/1976 | Langer et al. | 136/145 |
| 4,078,125 | 3/1978 | Brown | 429/145 |
| 4,144,301 | 3/1979 | Adams et al. | 264/126 |
| 4,201,641 | 5/1980 | Gotoda et al. | 429/254 X |
| 4,234,623 | 11/1980 | Moshtev et al. | 427/54.1 |
| 4,273,840 | 6/1981 | Machi et al. | 429/144 |
| 4,356,101 | 10/1982 | Jackovitz et al. | 252/182.1 |
| 4,378,414 | 3/1983 | Furukawa et al. | 429/144 |
| 4,383,015 | 5/1983 | Buzzelli | 429/206 |
| 4,468,441 | 8/1984 | D'Agostino et al. | 429/254 X |

FOREIGN PATENT DOCUMENTS

| | | | |
|---|---|---|---|
| 5450829 | 9/1977 | Japan . | |
| 5795069 | 5/1980 | Japan . | |
| 58-189957 | 11/1983 | Japan | 429/144 |

OTHER PUBLICATIONS

*Plastics Materials*, J. A. Brydson, D. Van Nostrand Co., 1966, pp. 98–133.

*Primary Examiner*—Stephen J. Kalafut
*Attorney, Agent, or Firm*—Daniel P. Cillo

[57] ABSTRACT

A silver-iron battery is made comprising a case 14 and a cover 15 within which are disposed at least one silver electrode 11, at least one iron electrode 12, a separator system 13 between the electrodes and an alkaline electrolyte, where the separator system contains at least a layer of low density polyethylene, having a density of from about 0.91 g./cm$^3$ to about 0.92 g./cm$^3$, graft co-polymerized with an acrylic material, disposed next to the silver electrodes, and at least a layer of high density polyethylene, having a density of from about 0.95 g./cm$^3$ to about 0.96 g./cm$^3$, graft co-polymerized with an acrylic material, disposed next to the iron electrodes, and where a layer of cellophane can also be included next to the low density polyethylene and a middle layer of low density polyethylene and be included between the cellophane and the high density polyethylene.

14 Claims, 1 Drawing Sheet

SEPARATOR SYSTEMS FOR SILVER-IRON BATTERIES

TECHNICAL FIELD

The present invention relates to multi-ply polyethylene separator systems for use between positive and negative plates in a silver-metal battery, particularly a silver-iron battery.

BACKGROUND OF THE INVENTION

Silver-iron batteries are well known in the art, and are taught by Brown, in U.S. Pat. No. 4,078,125, and Buzzelli, in U.S. Pat. No. 4,383,051. These patents teach the use of perforated silver sheet or expanded silver screen supports containing active silver material for positive plates, either sulfurized iron oxide negative plates according to the teachings of Jackovitz et al., U.S. Pat. No. 4,356,101, or sintered metallic iron negative plates. Brown and Buzzelli, in the above patents, both taught a multi-ply separator between positive and negative plates. The separator contained alternating porous and microporous sheets of polypropylene. One of the sheets, made of 60% to 90% porous, non-woven polypropylene, having 4 micron to 30 micron pores, was placed next to the silver electrode. The microporous polypropylene had pores of from about 0.05 micron to 3 micron diameter. Total separator thickness was generally about 0.050 to 0.075 cm (0.020 to 0.030 inch).

The silver-iron battery is now generally considered more stable than the silver-zinc battery. The silver-zinc battery has always presented major problems of internal electrical shorts due to zinc dendritic growth from the negative plate through the separator system. The soluble silver in both silver-zinc and silver-iron systems has also caused some problems. One problem has been the tendency to form a silver conducting film on the separators, which could allow shorting. Both battery systems are quite expensive, and are usually restricted to applications where the energy density of the battery is critical to the total system mission. An example of such an application is the propulsion system power source for underseas vehicles.

A number of patents have issued on improved battery separator materials for use in silver batteries, most for use with silver-zinc couples. Langer et al., in U.S. Pat. Nos. 3,749,604 and 3,953,241, taught a porous, caustic resistant, polymeric support, such as polypropylene, polytetrafluoroethylene or the like, coated on at least one side with a polymeric matrix, such as polysulfone having pore diameters of from about 5 microns to 50 microns, containing inorganic filler particles. This separator was found useful for silver-zinc or silver-iron couples. Moshtev et al., in U.S. Pat. No. 4,234,623, taught a five layer battery separator for alkali accumulator batteries. The separator contained, in order: inert, outside polyester layer; cellulose material, such as cotton, impregnated with methacrylic acid; central, irradiated, activated, low density (0.925 g./cm$^3$) polyethylene film, about 35 microns thick, graft polymerized with methacrylic acid, where there was a high degree of grafting, i.e., 80+%; cellulose material, such as cotton, impregnated with methacrylic acid; and inert, outside polyester layer. Minimum separator thickness, prior to any pressing, was about 495 microns (0.02 inch).

Nagamine et al., Japanese Pat. Kokai No. 54-50829 [Application No. 52-116415], relates to separators for silver-zinc mercurate button cells. The separator contained, in order outer cellophane film; porous, synthesized, high-molecular weight polyethylene, polypropylene, polytetrafluoroethylene, or polyester film; and outer cellophane film. Another embodiment of the separator contained one piece of cellophane film, and either one or two pieces of porous, synthesized, high-molecular weight polyethylene, polypropylene, or polytetrafluoroethylene film. Nagamine et al., Japanese Pat. Kokai No. 57-95069 [Application No. 55-171763], relates to a laminated separator for silver-zinc button cells. The laminated separator contained, in order: irradiated, polyethylene film, graft polymerized with acrylic acid or meth-acrylic acid (where there was a 20% to 40% graft rate), next to the silver anode material; cellophane film, 20 micron to 30 micron thick; irradiated polyethylene film, graft polymerized with acrylic acid or meta-acrylic acid (where there was a 45% to 90% graft rate); and outside single or double cellophane sheets, each 20 microns to 30 microns thick. The prior art was characterized in Table 1 as cellophane film sandwiched by two pieces of graft polymerized polyethylene films with equal graft rates. Adams et al., in U.S. Pat. No. 4,144,301, taught a deposited film or shaped envelope separator, for use in electrolytic cells. The separator contained a single sheet of irradiated, low density polyethylene, or polypropylene, graft polymerized with acrylic acid or meth-acrylic acid.

While many of these separator materials may be somewhat resistant to oxidation by divalent silver ions, many of them may also allow cellophane degradation by silver ions, and most would allow long term diffusion of silver ions into the electrolyte. Cellulose has been found to be subject to hydrolytic attack and to degrade in electrolyte at temperatures over 45° C. Polypropylenecellophane combinations have been found to allow large scale silver mirror build-up, which over a long period of time could cause shorts between any silver-metal battery couple. The separator can be the weakest component in a sophisticated battery, and generally is the primary life limiting source for silver-iron batteries, since the iron electrode is stable (unlike zinc electrodes).

A superior separator system for a long-life, high energy density, silver-iron battery, utilizing high discharge rate silver electrodes, requires a separator that allows rapid passage of electrolyte ions; helps protect any cellulose material present from silver ions; provides stable performance in concentrated alkaline solution over a temperature range of from about 0° C. to 45° C., and preferably up to 70° C.; eliminates oxidation by divalent silver ions or oxygen; absorbs electrolyte; is ultra thin, i.e., less than about 0.05 cm (0.02 inch); and most importantly, prevents long term silver ion migration. What is needed is a sophisticated separator system capable of achieving all these goals.

It is an object of this invention to provide a separator system for long life, high energy density, high discharge rate silver-iron batteries, where the separator is thin, will resist heat and chemical degradation, and will markedly decrease the possibility of electrical shorting.

SUMMARY OF THE INVENTION

The above needs and objects have been met by the present invention, which provides a silver-iron battery comprising: at least one positive silver electrode plate, at least one negative metal plate, preferably an iron electrode plate, housed in a case containing an alkaline electrolyte, where a multi-ply, high and low density polyethylene separator system is disposed between positive and negative electrodes. In its basic combination, the separator system comprises a layer of low density polyethylene and a layer of high density polyethylene, both graft co-polymerized with an acrylic material, such as acrylic acid or methacrylic acid.

The separator system in preferred form contains inside 0.002 cm to 0.005 cm thick (0.0008 inch to 0.0020 inch) layer of crosslinked, low density polyethylene, radiation graft co-polymerized with acrylic material, which, in use, contacts the silver electrode; 0.002 cm to 0.005 cm (0.0008 inch to 0.0020 inch) layer of cellophane; middle 0.002 cm to 0.005 cm thick (0.0008 inch to 0.0020 inch), layer of crosslinked, low density polyethylene, radiation graft co-polymerized with acrylic material; and outside 0.004 cm to 0.010 cm (0.0015 inch to 0.004 inch) thick layer of crosslinked, high density polyethylene, radiation graft co-polymerized with acrylic material. The cellophane should be sandwiched between the polyethylene materials, which configuration appears to prevent the cellophane from degradation by silver ions. Polypropylene or polytetrafluoroethylene cannot be substituted for polyethylene.

This construction provides a separator composite that in its preferred form is only from about 0.010 cm to 0.025 cm (0.004 inch to 0.010 inch) thick. This construction saves a tremendous amount of space in the battery, yet resists cellophane degradation, can provide stable low and high temperature performance, eliminates oxidation by divalent silver ions, and prevents long term silver migration. A silver-iron battery utilizing this separator system can have a life beyond 500 continuous deep discharge cycles with no significant loss in capacity, and can allow in its broadest form, cycling at temperatures of up to 70° C. without separator degradation.

BRIEF DESCRIPTION OF THE DRAWINGS

The invention will become more readily apparent from the following description of preferred embodiments thereof shown, by way of example only, in the accompanying drawings, wherein.

DESCRIPTION OF THE PREFERRED EMBODIMENTS

Figure 1:
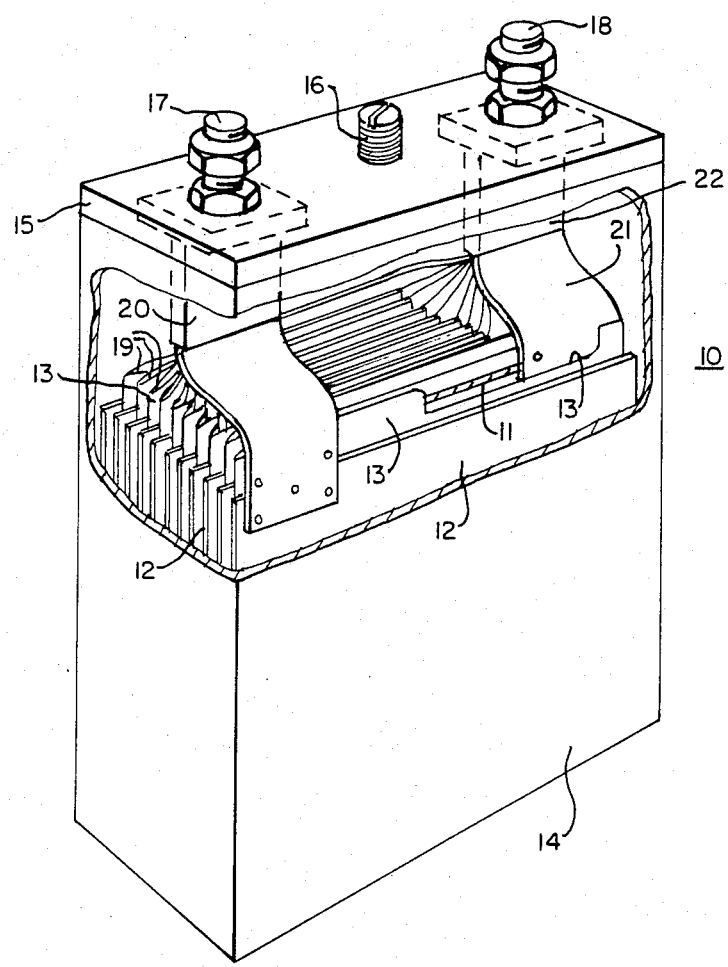
FIG. 1, which best illustrates the invention, shows a perspective view of one embodiment of a silver-iron battery containing the separator system of this invention.

Referring now to FIG. 1 of the Drawings, silver-metal battery 10, such as a silver-iron battery is shown, with a plurality of positive silver electrode plates 11, a plurality of negative electrode plates, preferably Fe electrode plates 12, plate separators 13 between the positive and negative plates, all housed in case 14, having cover 15, optional vent 16, negative terminal 17, and positive terminal 18. Positive electrical lead tabs 21 are shown attached to intercell connection lug 22 and negative electrical lead tabs 19, disposed 180° away from the positive tabs, are shown attached to intercell connection lug 20. These lugs and tabs provide means for making electrical connections to the respective plates. A suitable alkaline electrolyte, generally 25% to 45% aqueous KOH, with possible addition of minor amounts of alkali metal hydroxide, such as lithium hydroxide, would contact the electrode plates and separators within the case.

The silver electrode plates 11 may be made of perforated silver sheet, expanded silver screen, or silver powder particles bonded to at least one suitable metal or metal coated support-current collector. All types of silver electrodes can be used as the positive plate in this invention as long as it has a porous structure, preferably from about 50% to 80% porous.

The well known, fiber metal iron electrode structure can be used as the negative plates 12 in this invention. This is a flexible, expansible, compacted sheet of relatively smooth, generally contacting, intermingled, metal fibers. Generally, the fibers when they are round have diameters between about 0.00051 to 0.0127 cm (0.0002 to 0.005 inch). The plaque porosity is preferably between 75% and 95% porous, i.e., having a density between 5% and 25% of theoretical density. Further details on this type of structure, and suitable iron active materials that can be used therewith, can be found in U.S. Pat. No. 4,078,125, herein incorporated by reference.

One of the preferred iron electrodes is made by calcining iron sulfate in an oxidizing atmosphere at a temperature in the range of from about 600° C. to about 850° C. for a time sufficient to produce an iron oxide with a trace amount of sulfate, and heating the sulfur containing iron oxide in a reducing atmosphere to produce activated elemental iron having a trace amount of sulfide (0.002 wt. % to 1 wt. %). This can then be applied to a suitable supportcurrent collector. Further details on this material can be found in U.S. Pat. No. 4,356,101, herein incorporated by reference.

Another preferred iron electrode is made of sintered metallic iron, where the active, metallic, elemental iron itself constitutes the active electrode material. This structure can be made self-supporting, or can be used with at least one, nickel or nickel plated steel wool, mesh, or expanded metal sheet current collector. This electrode does not contain any sulfur or sulfur activators. The active battery material comprises substantially pure iron particles. This material can be produced from ferric oxide ($Fe_2O_3$) The $Fe_2O_3$ can be thermally reduced to metallic iron, $Fe°$, between about 400° C. and about 1,000° C., in a reducing atmosphere, preferably $H_2$. It can then be ground or otherwise pulverized to a generally spherical particulate powder having an average particle size of between about 10 micron and about 275 micron diameter. The sized iron is pressed by a suitable pressing means, such as flat bed press, to provide a structure that can be handled. The structure, by itself or pressed to a supporting current collector, is then sintered at between about 700° C. and about 1,000° C., in a reducing atmosphere, preferably $H_2$. The particles sinter at their contact points to provide an interconnected, contacting, generally spherical agglomerate, sponge-like, metallic structure of iron. Further details on this material can be found in U.S. Pat. No. 4,383,015, herein incorporated by reference.

Figure 2:
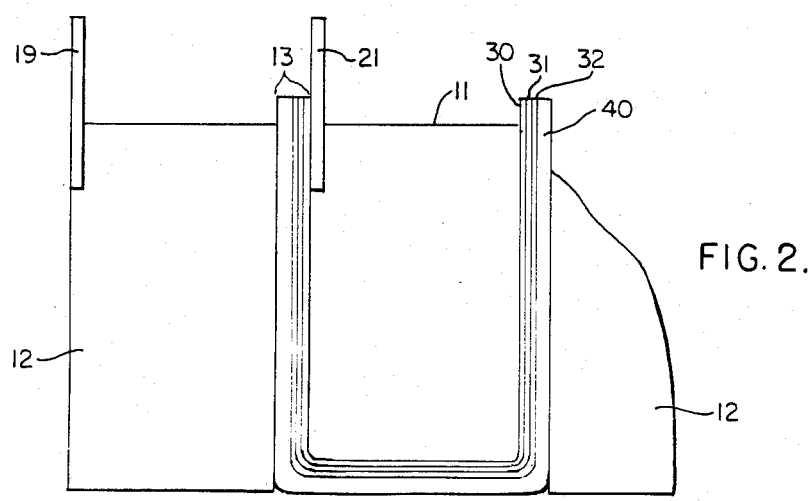
FIG. 2 shows a sectional view of one embodiment of the preferred multi-ply separator of this invention, containing four layers, disposed between silver and iron electrodes.

Referring now to FIG. 2 of the Drawings, the preferred separator 13 of this invention is shown in detail. This preferred separator can be utilized in any fashion to separate the positive silver electrode 11 from the negative iron electrodes 12, as long as a graft copolymerized layer of the separator contacts the silver electrode face. In the embodiment shown, the separator 13 is shown as an envelope, wrapped around, and extending above the top of the silver electrode 11. The preferred separator system 13 consists essentially of a multi-ply, i.e., two sheets or more, high and low density polyethylene-cellulose composite. Discussion of the broader, more basic separator system will follow discussion of the preferred system.

Essential, inside layer 30 is a 0.002 cm to 0.005 cm (0.0008 inch to 0.0020 inch) thick layer of low density (from about 0.91 g./cm$^3$ to about 0.92 g./cm$^3$), preferably crosslinked polyethylene, radiation graft co-polymerized with at least one of acrylic acid, methacrylic acid, their mixtures, or the like, to form a membrane. This is a porous, radiation grafted, weak cationic membrane of low electrolytic resistance, less than about 258 m$\Omega$-cm$^2$, preferably from about 25.8 to about 258 m$\Omega$-cm$^2$ (4 to 40 m$\Omega$-in$^2$) in 30% KOH at 25° C., where m$\Omega$=milli ohms. Layer 30 must be placed next to the silver electrode. This layer is effective in retarding the passage of silver ions and preventing a high concentration at the cellophane next to it. The crosslinking ties the linear polyethylene chains together, to form a three dimensional structure, increases the dimensional and thermal stability of the film, and radically improves its resistance to silver ion degradation, making it essentially inert to the chemical battery reactions. This membrane may contain minor amounts of nonionic surfactant. This film, alone, serves to retard silver ion migration for the short term (about 50 to 75 cycles) in silver-iron batteries, but must be combined with at least an outer membrane of high density radiation graft co-polymerized polyethylene 40 to be useful in the long term (500 cycles). This dual film combination, layer 30 and layer 40, constitutes the basic separator system.

A middle component 31 of the preferred separator system 13, is a 0.002 cm to 0.005 cm (0.0008 inch to 0.0020 inch) thick sheet of battery grade cellophane (regenerated cellulose). Cellophane can be very useful in the separator system, since it retards the advance of silver ions toward the iron plate 12. The cellophane must be protected from hydrolytic attack by silver ions in alkaline electrolyte, however.

A second layer 32 of porous, 0.002 cm to 0.005 cm thick, low density, preferably crosslinked polyethylene, radiation graft co-polymerized with at least one of acrylic acid, methacrylic acid, their mixtures, or the like, similar to porous layer 30, is used to sandwich the cellophane sheet, and to reduce any further migration of the silver ions in a battery system where long life is essential.

An essential, final, outside layer 40, that is totally permeable to electrolyte ions but essentially impermeable to higher valent hydrated silver ions is disposed next to the iron electrodes 12, one of which is shown in cut away form in FIG. 2 for ease of describing the separator system. This layer is a 0.004 cm to 0.010 cm (0.0015 inch to 0.004 inch) thick layer of high density (from about 0.95 g./cm$^3$ to about 0.96 g./cm$^3$), preferably cross-linked polyethylene, radiation graft co-polymerized with at least one of acrylic acid, methacrylic acid, their mixtures, or the like, to form a membrane. This is a radiation grafted, weak cationic membrane of high electrolytic resistance, greater than about 516 m$\Omega$-cm$^2$, preferably from about 516 to about 774 m$\Omega$-cm$^2$ (80 to 120 m$\Omega$-in$^2$) in 30% KOH at 25° C. This layer is effective to essentially block passage of silver ions.

Electrolytic resistance is defined as a measure of diffusion capability of the membrane. The higher the electrolytic resistance, the higher the silver ion retardation. In both the low and high density polyethylene, the graft co-polymerization rate will range from about 15% to about 40% of acrylic material. For example, 15 wt. % to 40 wt. % of the low or high density polyethylene sheet can be composed of grafted acrylic or methacrylic acid. As in films 30 and 32, crosslinking increases the dimensional and thermal stability of the film and radically improves its resistance to silver ion degradation, making it essentially inert to the chemical battery reactions.

These membranes can be made by first crosslinking the polyethylene by an effective wavelength of gamma radiation, to form a tight configuration insoluble in most solvents. Then, the crosslinked polyethylene can be mixed with the acrylic and/or methacrylic acid and the mixture irradiated by gamma radiation of a wavelength effective to cause graft co-polymerization between the two components. This is what is meant by radiation graft co-polymerized, and such is well known in the art. The radiation grafting adds pendant chains to the polyethylene film. These materials are cationic (will exchange OH$^-$ions) as is required when an alkaline electrolyte is to be used.

Use of all three of the materials described as the four layers in the separator system provide the best long term resistance to shorting between positive and negative plates at temperatures up to about 45° C. The low and high density polyethylene, when disposed as heretofore described, will help protect the cellophane component from excessive concentrations of silver ions in alkaline electrolyte, and will allow extension of battery life beyond 500 continuous, deep discharge cycles with no significant loss in capacity. These layers may be applied independently of each other, or preferably, some may be bonded together to form a laminate structure and be applied as such. As can be seen from FIG. 2, even the preferred four layer separator system 13 is very thin, about 0.010 cm to 0.025 cm (0.004 inch to 0.010 inch) and saves a tremendous amount of space, allowing use of more battery electrode plates 11 and 12 per unit volume. The plates 11 and 12 are usually at least about 0.1 cm (0.04 inch) thick each.

As mentioned previously, the cellophane layer can be eliminated from the separator system. This can be beneficial if the silver-iron battery is to operate for long periods at temperatures between 45° C. and 70° C. Thus, in the simplest and broadest embodiment, cellophane layer 31, and middle, low density graft co-polymerized polyethylene layer 32 can be eliminated. In such an embodiment, the low density polyethylene, radiation graft copolymerized with acrylic acid or methacrylic acid, should have a thickness in the range of 0.0038 cm to 0.0051 cm (0.0015 inch to 0.0020 inch). Two sheets can be used together to achieve this thickness. Similarly, the high density polyethylene, radiation graft co-polymerized with acrylic or methacrylic acid, should have a thickness in the range of 0.0076 cm to 0.0102 cm (0.003 inch to 0.004 inch). Two sheets can be used together to achieve this thickness. In all cases, the low density, radiation graft co-polymerized polyethylene must be next to the silver electrode. At normal operating temperatures, however, i.e., below about 45° C., use of cellophane sandwiched between low density graft co-polymerized polyethylene does have advantages of retarding silver migration, as long as the silver ions are bled to the cellophane through the polyethylene at a slow controlled rate.

The polyethylene materials used as the separator components cannot be substituted for. The term "high density polyethylene" means a density of from about 0.95 to g./cm$^3$ to about 0.96 g./cm$^3$ and the term "low density polyethylene" means a density of from about 0.91 g./cm$^3$ to about 0.92 g./cm$^3$. These terms are well known in the art, involve narrow and independent ranges, and represent two completely different types of materials. Low density polyethylene can be made by the High Pressure Polymerization Method, while high density polyethylene can be made by the Phillips or Standard Oil Process. Low density polyethylene has a crystalline melting point of from about 105° C. to about 115° C. and contains from about 15 to about 40 CH$_3$ groups/1000 carbon atoms, while high density polyethylene has a crystalline melting point of from about 125° C. to about 140° C. and contains from about 1 to 2 CH$_3$ groups/1000 carbon atoms. Further details on these materials can be found in *Plastics Materials*, J. A. Brydson, D. Van Nostrand Co., 1966, pp. 98–133, herein incorporated by reference. Various methods of co-polymerizing polyethylene with acrylic acids are also well known in the art, and taught, for example, in U.S. Pat. Nos. 4,144,301 and 4,234,623, herein incorporated by reference.

The following example further illustrates the invention and should not be considered in any way limiting.

EXAMPLE 1

A number of silver-iron battery stacks were made. In each stack, two silver electrodes were tested as the end electrodes in a three plate battery cell stack vs. one sintered iron electrode. The electrodes were about 37 cm ×11 cm×0.152 cm thick (14⅝ inches×4¼ inches×0.06 inch thick) to provide single face surface areas of about 400 cm$^2$. The silver electrodes were wrapped in a sealed, separator system envelope, with a height about one inch above the top of the silver electrodes. In one instance the iron plate was also wrapped with a porous separator material. The distance between electrodes was slightly more than the separator system thickness. Four of these three plate stacks were placed in a plexiglass case and filled with electrolyte, to a height of one inch above the electrodes, i.e., one inch below the electrode separator height. The electrolyte contained 40% aqueous KOH. The iron electrode, which was the capacity limiting electrode in these tests was rated at 46 ampere hours at C/6 rates (capacity in Ah/hours which result in Amperes). In all cases, the initial charging cycle was at 4A for 20 hours to activate (form) the silver plates, and subsequent charge cycles were at 10A for 5.6 hours, followed by discharge at 7A to a cell voltage cut-off of 0.93 volts. Electrolyte temperature in all cases was initially between 25° C. and 28° C. and then was raised to between 55° C. and 60° C. Capacity was measured for each silver-iron battery stack. The results are shown below in Table 1:

TABLE 1

| Battery Stack | Separator System And Thickness | Ampere-Hr and Condition |
|---|---|---|
| 1. Silver.Iron Silver Only Silver electrode wrapped in separator system | One layer each of low density polyethylene g.c.p. with methacrylic acid next to silver electrode.cellophane. low density polyethylene g.c.p. with methacrylic acid.high density polyethylene g.c.p. with methacrylic acid next to iron electrodes**. Total thickness: 0.015 cm (0.006 inch). | 45 to 48 Ampere-Hr for 330 cycles at 25° C. to 28° C. Electrolyte clear. 45 to 48 Ampere-Hr for 24 cycles more at 55° C. to 60° C. Electrolyte clear after a total of 354 cycles. |
| *2 Silver.Iron Silver Only silver electrode wrapped in separator system Comparative Example | One layer each of low density polyethylene g.c.p. with methacrylic acid next to silver electrode.cellophane.low density polyethylene g.c.p. with methacrylic acid next to iron electrodes**. Total thickness: 0.012 cm (0.005 inch). No high density polyethylene layer. | 45 to 48 Ampere-Hr for 250 cycles at 25° C. to 28° C. Electrolyte clear. 45 to 48 Ampere-Hr for 5 to 10 cycles more at 55° C. to 60° C. thereafter decline in performance and yellow coloration in electrolyte indicating breakdown of cellophane layer. In another test to reach performance maximum at 28° C., 45 to 48 Ampere-Hr for 275 cycles at 25° C. to 28° C. Electrolyte clear. After cycle 275 through 285, electrolyte developed a yellow coloration and performance declined indicating breakdown of cellophane layer. |
| *3 Silver.Iron Silver All three electrodes wrapped in separator system Comparative Example. | Polypropylene.3 layers cellophane around silver electrode. Polypropylene around iron electrode. System = polypropylene.cellophane. polypropylene. Total thickness: 0.02 cm (0.008 inch). | 46 to 48 Ampere-Hr for 80 cycles at 25° C. to 28° C. Electrolyte clear. At cycle 90, electrolyte turned yellow-brown indicating break down of cellophane layers, and performance dropped to 42 Ampere-Hr and silver mirror formations began to appear on the side edges of the separator faces. At cycle 94, the electrolyte temperature was raised to 60° C. and by cycle 97 the performance dropped to 25 Ampere-Hr. |

*Comparative Example
**g.c.p. = radiation graft co-polymerized. In all cases both high and low density polyethylene was in crosslinked form, and the grafting rate was from 15% to 40% of acrylic material. The low density polyethylene had a density of 0.91 to 0.92 g./cm$^3$ and in g.c.p. form had an electrolytic resistance of 25.8 to 258 mΩ-cm$^2$. The high density polyethylene had a density of 0.95 to 0.96 g./cm$^3$ and in g.c.p. form had an electrolytic resistance of 516 to 774 mΩ-cm$^2$ The only difference between the battery stack of this invention, No. 1, and comparative stack, No. 2, was inclusion in stack No. 1 of the outer sheet of high density polyethylene, radiation graft co-polymerized with methacrylic acid, and an increase of separator system thickness of only 0.003 cm. Stack No. 1 operated at stable condition for over 300 cycles at normal temperature and continued for at least 24 more cycles for the initial test even when operated at 55° C. to 60° C., indicating substantial protection of the cellophane sheet. Comparative stack No. 2 showed a definite decline in stability after 5 to 10 cycles at 55° C. to 60° C., and showed its maximum stability at 25° C. to 28° C. to be about 285 cycles.

Additional thermal studies show that stack No. 1 would operate in stable condition for 500 cycles at 25° C. to 28° C. with no degradation or shorting. Additional thermal studies also confirmed: that comparative stack No. 2 would last from about 275 to 300 cycles at 25° C. to 28° C. with little degradation or shorting; and that elimination of cellophane from stack No. 1, providing the basic separator system of this invention, would allow at least 200 cycles at 55° C. to 60° C. with little degradation or shorting. Comparative sample No. 3 was taken apart and the separator was chemically analyzed, with results showing that high concentrations of silver were present and were sufficient to cause electrical leakage at the silver-iron interface.

We claim:

1. A silver-iron battery comprising a case and a cover within which are disposed at least one silver electrode, at least one iron electrode, a separator system between the electrodes, alkaline electrolyte, and means and for making electrical connections to the respective electrodes, the improvement characterized in that the separator system comprises:
   (a) a layer of low density polyethylene film, having a density of from about 0.91 g./cm³ to about 0.92 g./cm.³, graft co-polymerized with an acrylic material, disposed next to the silver electrodes, and
   (b) a layer of high density polyethylene film, having a density of from about 0.95 g./cm³ to about 0.96 g./cm³, graft co-polymerized with an acrylic material, disposed next to the iron electrodes.

2. The silver-iron battery of claim 1, where the low density polyethylene layer has a thickness of from 0.002 cm to 0.005 cm and an electrolytic resistance less than 258 mΩ-cm², and the high density polyethylene layer has a thickness of from 0.004 cm to 0.010 cm and an electrolytic resistance greater than 516 mΩ-cm², and where both are weak cationic membranes.

3. The silver-iron battery of claim 1, where the acrylic material is at least one of acrylic acid and methacrylic acid, which is radiation graft co-polymerized to both the high and low density polyethylene film, and where both the high and low density polyethylene are crosslinked prior to grafting.

4. The silver-iron battery of claim 1, where the separator system has a cellophane layer disposed between the low density polyethylene layer and the high density polyethylene layer, and the graft co-polymerization rate is from about 15% to about 40% of acrylic material.

5. The silver-iron battery of claim 1, where the iron electrode comprises iron particles.

6. A silver-iron battery comprising a case and a cover within which are disposed at least one silver electrode, at least one iron electrode, a separator system between the electrodes, alkaline electrolyte, and means for making electrical connections to the respective electrodes, wherein the electrolyte comprises an alkaline hydroxide, and the separator system consists essentially of:
   (a) a layer of low density polyethylene film, having a density of from about 0.91 g./cm³ to about 0.92 g./cm³, graft co-polymerized with an acrylic material selected from the group consisting of acrylic acid, methacrylic acid, and their mixtures, disposed next to the silver electrodes;
   (b) a layer of cellophane film next to the low density polyethylene;
   (c) a middle layer of low density polyethylene film, having a density of from about 0.91 g./cm³ to about 0.92 g./cm³, graft co-polymerized with an acrylic material selected from the group consisting of acrylic acid, methacrylic acid, and their mixtures, disposed next to the cellophane; and
   (d) a layer of high density polyethylene film, having a density of from about 0.95 g./cm³ to about 0.96 g./cm³, graft co-polymerized with an acrylic material selected from the group consisting of acrylic acid, methacrylic acid, and their mixtures, disposed next to the iron electrodes.

7. The silver-iron battery of claim 6, where the cellophane layer has a thickness of 0.002 cm to 0.005 cm, both low density polyethylene layers have a thickness of from 0.002 cm to 0.005 cm and an electrolytic resistance less than 258 mΩ-cm², the high density polyethylene layer has a thickness of from 0.004 cm to 0.010 cm and an electrolytic resistance greater than 516 mΩ-cm², and where all three types of layers are weak cationic membranes.

8. The silver-iron battery of claim 6, where the acrylic material is radiation graft co-polymerized to both the high and low density polyethylene film, and where both the high and low density polyethylene are crosslinked prior to grafting.

9. The silver-iron battery of claim 6, where the low density polyethylene layers have an electrolytic resistance of from 25.8 mΩ-cm² to 258 mΩ-cm², and are effective to pass retard passage of silver ions, the high density polyethylene layer has an electrolytic resistance of from 516 mΩ-cm² to 774 mΩ-cm², and is effective essentially to block passage of silver ions, and the graft co-polymerization rate is from about 15% to about 40% of acrylic material.

10. The silver-iron battery of claim 6, where the electrolyte is aqueous KOH, and the iron electrode comprises a sintered, interconnected, metallic structure of iron, where metallic, elemental iron itself constitutes the active electrode material.

11. The silver-iron battry of claim 1, where the iron electrode comprises iron particles and the silver electrode is selected from the group consisting of perforated silver sheet, expanded silver screen, and silver powder particles bonded to a support.

12. The silver-iron battery of claim 1, where the iron electrode comprises iron particles and the silver electrode comprises silver particles.

13. The silver-iron battery of claim 6, where the iron electrode comprises iron particles and the silver electrode is selected from the group consisting of perforated silver sheet, expanded silver screen, and silver particles bonded to a support.

14. The silver-iron battery of claim 6, where the iron electrode comprises iron particles and the silver electrode comprises silver particles.

* * * * *